United States Patent [19]

Vogel et al.

[11] Patent Number: 5,332,295

[45] Date of Patent: Jul. 26, 1994

[54] BICYCLE HUB

[76] Inventors: David Vogel, 12 Clark Rd., Barrington, R.I. 02806; Jonathan M. Glick, 6505 Marsol Rd., Mayfield Heights, Ohio 44124

[21] Appl. No.: 780,358

[22] Filed: Oct. 22, 1991

[51] Int. Cl.⁵ .............................................. B60B 27/00
[52] U.S. Cl. ................................... 301/110.5; 301/59
[58] Field of Search ............... 301/55, 56, 59, 110.5

[56] References Cited

U.S. PATENT DOCUMENTS

| | | | |
|---|---|---|---|
| 2,280,936 | 4/1942 | Swanson | 301/105 BX |
| 3,170,549 | 2/1965 | Baker, III | 301/105 BX |
| 3,645,580 | 2/1972 | Spies | 301/59 X |
| 3,922,018 | 11/1975 | Shook | 301/105 B |
| 4,145,095 | 3/1979 | Segawa | 301/105 BX |
| 4,300,804 | 11/1981 | Hasebe | 301/56 X |
| 4,424,981 | 1/1984 | Maxwell, III | 301/105 BX |
| 4,789,206 | 12/1988 | Ozaki | 301/105 BX |

FOREIGN PATENT DOCUMENTS 140895  1/1920  United Kingdom ............ 301/105 B

Primary Examiner—Russell D. Stormer
Attorney, Agent, or Firm—Fisher, Nissen, Goldberg & Kiel McAulay

[57] ABSTRACT

A bicycle wheel hub has a pair of spoke flanges disposed on an elongated cylinder with the spoke flanges having holes for accepting spoke ends therein. The flanges are placed at a spacing of from about 32–42 millimeters to provide a narrow frontage for reducing aerodynamic drag and reduced spoke length, thereby increasing aerodynamic and weight efficiency, yet maintaining or increasing lateral strength.

2 Claims, 3 Drawing Sheets

5,332,295

BICYCLE HUB

TECHNICAL FIELD

This invention relates to a bicycle hub and more particularly to an aerodynamic hub which reduces drag in a bicycle wheel.

BACKGROUND

Typically, a bicycle has front and rear wheels which are rotatably supported on bearings disposed within a hub. Spokes extend from a pair of spaced flanges on the hub for supporting a rim upon which a tire is mounted. A shaft is typically fixed to a bicycle frame and passes through a central passage in the hub. The shaft has bearings disposed in-board of threaded ends which allow mounting the wheel to the frame. The rear wheel hub differs from the front wheel hub as it typically supports various gears which function as part of a drive system. The gears may either provide a single speed or multiple speed settings.

Recently, efforts have been made to produce more efficient bicycle wheels particularly seeking reduced weight and improved aerodynamics. For example, there is a trend towards the use of exotic composite materials and alloys for bicycle construction. However, such materials are quite expensive and components made from such materials are often difficult to repair.

One problem in bicycle wheel design involves reducing the aerodynamic drag caused by round spokes which extend from a conventional wheel hub. Such spokes extend from the sides of the narrow rim/tire combination and thus effectively increases the aerodynamic width of the wheel, causing increased drag. One solution is to use a front radially laced wheel with a standard wheel hub having a conventional flange spacing of about 55-70 millimeters. In a non-radial laced wheel, the spokes crossover each other in proximity to the hub and typically two spokes are in contact at the crossover point. The overlapping spokes increase the front profile of the wheel. In a radial laced wheel, there is no crossover or touching, exhibiting an aligned profile. The wheel may also have flattened spokes or oval spokes instead of round spokes, with the bladed or oval spokes offering less wind resistance than round spokes.

Another type of bicycle wheel uses either a segmented or whole disk instead of round spokes to reduce front wheel drag. These wheels are typically made of carbon fiber reinforced composite materials and are very expensive. They are also difficult to repair. While providing a more aerodynamic front profile than standard wheels, the whole disk wheels additionally are considered unstable in cross winds.

In a spoked wheel, there has been no effort to alter the spacing of the wheel hub flanges. If the flanges could be brought together with a narrower spacing, the angle of the wheel spokes could be made more vertical to reduce wind drag. However, if this is done, there is a perceived loss of lateral stiffness which is a measure of the force required to deflect the rim to the side, which may make the wheel more likely to collapse from side loads. Rear wheels typically are asymmetrical in terms of flange orientation due to the provision of multi-speed gear clusters. According to one authority, by moving the outer asymmetrical flange closer to the center to improve the balance in spoke tension and reduce offset, i.e. the differences in spoke tension due to the asymmetrical orientation of the flanges, would improve the balance of spoke tension but only at the expense of reducing lateral strength on both sides of the wheel. Consequently, it is commonly believed within the industry that if the flanges were moved closer together, lateral strength on both sides of the wheel would be reduced, which is considered unacceptable.

SUMMARY OF THE INVENTION

It is an object of the present invention to provide an aerodynamic bicycle wheel which maintains or increases lateral strength while reducing the flange spacing on a wheel hub.

It is a further object to provide an aerodynamic bicycle wheel which offers increased aerodynamic efficiency at low cost.

It is another object of the present invention to provide a bicycle wheel which can be made of conventional materials yet is of a low weight high strength construction.

These and other objects of the present invention are achieved by providing a bicycle wheel having a rim, a hub and spokes, the improvement comprising an aerodynamic hub which is an elongated cylinder, bearing means for rotatably supporting the hub, stationary shaft means for supporting the bearing means and a pair of spoke flanges, located on the hub and spaced apart at from about 32-42 millimeters.

Utilizing such a hub, the spokes are disposed in a more vertical relationship which insulates substantially more of the spoke surface from the frontal air stream and thus reduces aerodynamic drag. Such a spacing has been found not to reduce lateral wheel strength but rather may in fact produce increased lateral strength.

DETAILED DESCRIPTION OF THE INVENTION

Figure 1:
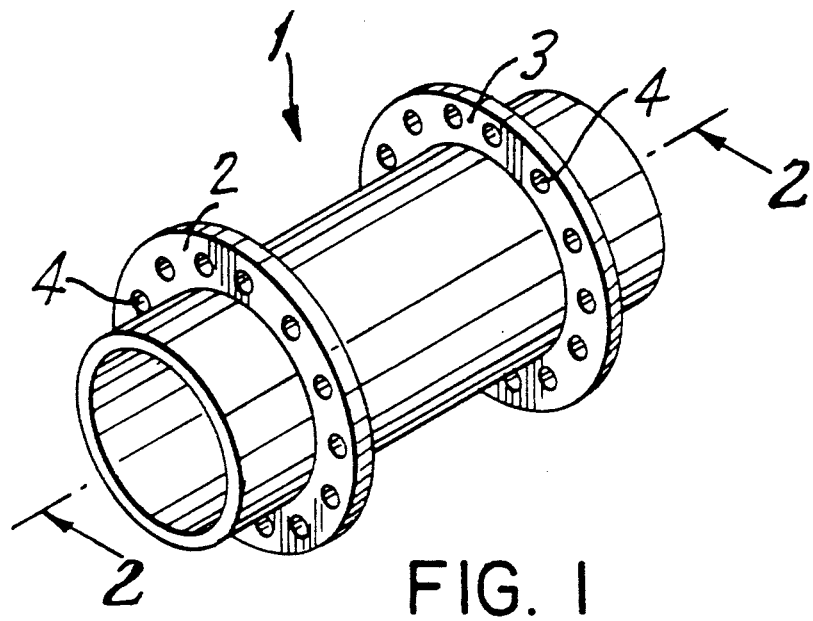
FIG. 1 is a perspective view of the wheel hub of the present invention.

Referring to FIG. 1, a wheel hub 1 is shown in the shape of a elongated cylinder. The hub 1 has spoke flanges 2 & 3 extending upwardly therefrom, each flange having holes 4 for accepting spoke ends (not shown) therein. The spokes may be round, flat, oval or another shape. Typically each flange has from 10 to 30 holes depending on the type of wheel to be produced.

Figure 2:
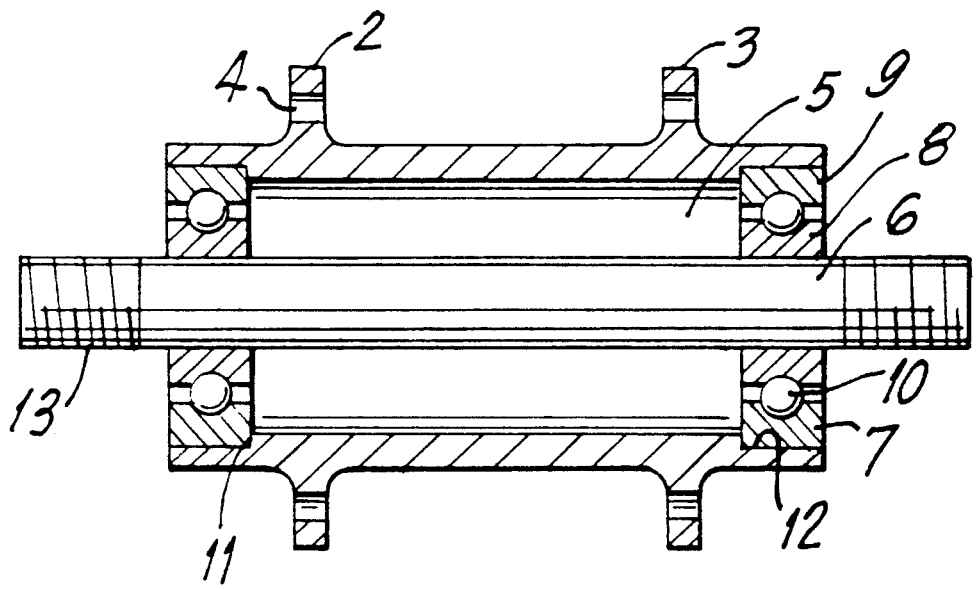
FIG. 2 is a cross-sectional view of the hub of FIG. 1 taken along line 2—2.

Referring to FIG. 2, the hub 1 has a central passage 5 within which a shaft 6 resides. The shaft is stationary and has a pair of bearings 7 disposed thereon. Each bearing has an inner stationary race 8 and an outer rotary race 9 separated by ball bearings 10. Recesses 11 & 12 are provided in the central passage to accept the rotary races therein, preferably with a close tolerance fit. The stationary shaft has threaded ends 13 & 14 for accepting threaded fasteners for mounting the wheel to a bicycle frame.

Figure 3:
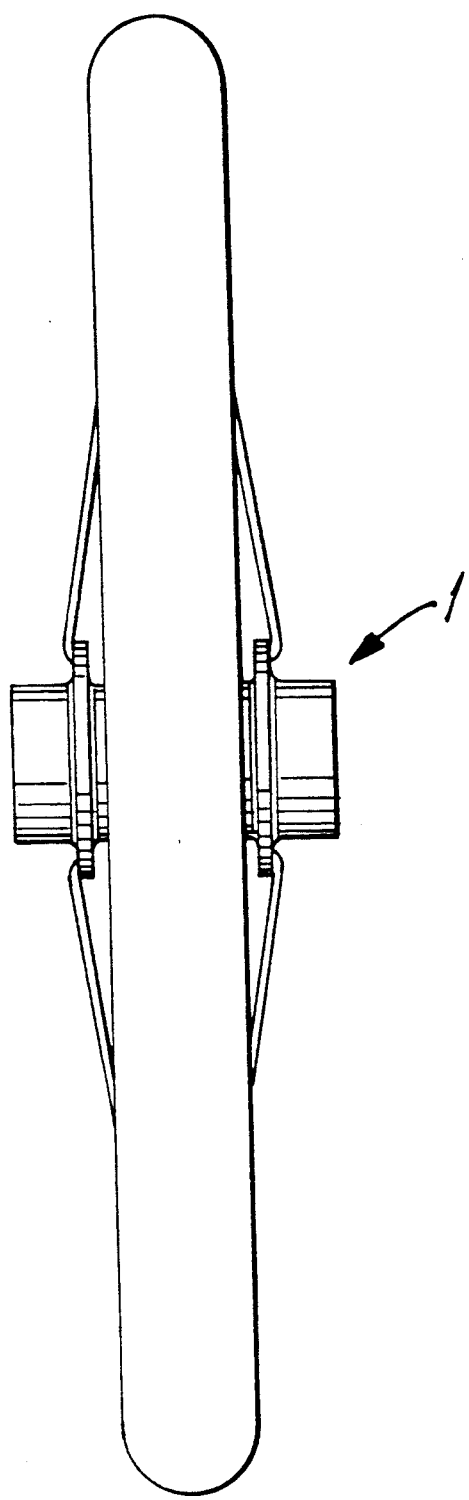
FIG. 3 is a front view of a wheel incorporating the hub of the present invention.

The flanges are spaced apart at from about 32-42 millimeters to minimize spoke induced aerodynamic drag, without resort to exotic materials or complex constructions. Preferably a spacing of 33-39 millimeter is used. Such a spacing maintains proper wheel strength and stiffness while reducing drag as substantially more of the spoke surface is sheltered from the frontal air stream. FIG. 3 shows the narrow wheel profile obtained using the wheel hub of the invention.

Figure 4:
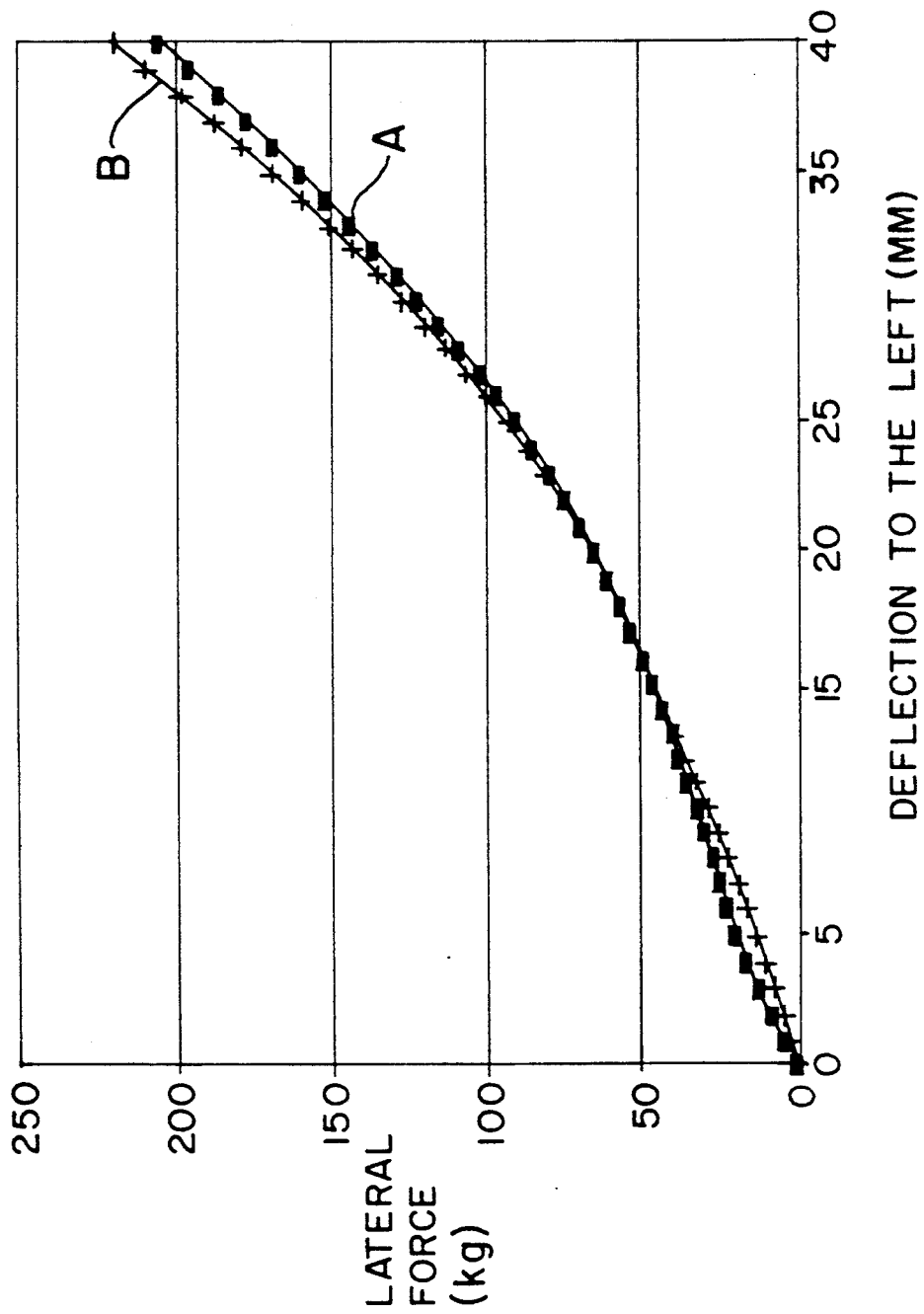
FIG. 4 is a graph illustrating the effect of the narrowed hub flanges on lateral strength.

Referring to FIG. 4, a graph illustrating the deflection to the left as a function of an applied lateral force is shown. Line A is a conventional 6-speed rear wheel hub; line B is the inventive narrowed hub having a spacing of 38 mm. Rather than decreasing lateral strength, the narrower flange spacing shows slightly better resistance to lateral force than the conventional 6-speed rear wheel hub.

The flange spacing on the inventive hub is at an optimum location where radial and lateral strengths are balanced and as such, wheels which incorporate the inventive hub are more balanced and are strong enough to accommodate a radial spoke pattern. Utilizing such a pattern allows the spokes to be shorter, a decrease in overall wheel weight. This works in combination with the narrower hub flanges to obtain an optimum minimized spoke length without sacrificing strength. Even with a non-radial lacing, the narrow flange spacing reduces and optimizes spoke length to achieve a weight savings. Consequently, the hub of the present invention provides increased aerodynamic efficiency, reduced weight and sufficient lateral strength to withstand side loads.

The hub is preferably produced of aluminum, but could be made of other materials such as titanium, magnesium or a high strength plastic. The spokes, shaft and bearings can be of conventional construction or may be of composite construction, depending on the utilization of the wheel. Regardless of the choice of materials of construction, the provision of narrowed spoke flanges on any bicycle wheel will result in aerodynamic efficiencies which were not before considered possible in view of the perceived loss in lateral strength which was believed to accompany such a change.

While preferred embodiments of the present invention have been shown and described, it will be understood by those skilled in the art that various changes and modifications could be made without varying from the scope of the present invention.

We claim:

1. A wheel hub for a bicycle comprising an elongated cylinder, the cylinder having a central passage therethrough and having means for mating with one or more bearings for rotationally supporting the hub, and, a pair of spoke flanges 2, 3 located on the hub and spaced apart at from about 32-42 millimeters, each spoke flange having means for attaching at least one spoke end thereto, said spoke flanges being positioned inboard from said means for mating with bearings.

2. The wheel hub of claim 1 wherein the flanges are spaced apart at from about 33-39 millimeters.

* * * * *